_United States Patent_ [19]

Harvey

[11] Patent Number: 4,904,321
[45] Date of Patent: Feb. 27, 1990

[54] MANUFACTURE OF A FLEXIBLE CORE FOR AN OPTICAL CABLE

[75] Inventor: Peter Harvey, London, England

[73] Assignee: BICC Public Limited Company, United Kingdom

[21] Appl. No.: 205,336

[22] Filed: Jun. 10, 1988

[30] Foreign Application Priority Data

Jun. 12, 1987 [GB] United Kingdom ................. 8713792

[51] Int. Cl.$^4$ ......................... B29D 11/00; G02B 6/44; B65H 81/02
[52] U.S. Cl. ..................................... 156/185; 264/1.5; 264/174; 350/96.23
[58] Field of Search ............................... 264/1.5, 174; 350/96.23; 156/185

[56] References Cited

U.S. PATENT DOCUMENTS 4,709,983 12/1987 Plessner et al. ................... 350/96.23
4,767,184 8/1988 Ogasawara ........................ 350/96.23
4,793,685 12/1988 Taylor et al. ..................... 350/96.23

FOREIGN PATENT DOCUMENTS 2185334 7/1987 United Kingdom .

_Primary Examiner_—James Lowe
_Attorney, Agent, or Firm_—Oliff & Berridge

[57] ABSTRACT

A helically grooved flexible optical cable core comprising a plurality of helically laid flexible bodies 1 of sector-shaped cross-section is manufactured by drawing a multiplicity of flexible non-metallic reinforcing elements 2 under tension through electrically insulating plastics material 3 in a semi-liquid state; causing the plastics encapsulated reinforcing elements to pass through an elongate die 23 having an outlet orifice 25 of sector-shape, which die, between its ends, is of such a shape that reinforcing elements adjacent the arcuate surface 4 of the body are travelling at a greater linear speed than reinforcing elements remote therefrom, and which has a blade 26 protruding inwardly of the die and forming in the arcuate surface of the body a longitudinally extending groove 5; causing the body as it emerges from the die to follow a helical path with its grooved arcuate surface outermost and so cooling the helically advancing body that the plastics material sets; partially filling the groove in the arcuate surface with a grease and continuously feeding an optical fibre into the grease in the groove; laying up the helically advancing body with a plurality of helically advancing bodies of similar cross-section and construction to form a flexible core of circular cross-section which is rotating about its longitudinal axis; and taking up the rotating core in such a way that any residual torsion in the core arising from said rotation is removed.

20 Claims, 3 Drawing Sheets

MANUFACTURE OF A FLEXIBLE CORE FOR AN OPTICAL CABLE

This invention relates to optical cables of the kind comprising a flexible core having in its outer circumferential surface a plurality of circumferentially spaced, helically extending separate grooves in at least one of which is loosely housed at least one optical fiber suitable for the transmission of light.

The generic term "light" includes the ultra-violet, visible and infra-red regions of the electromagnetic spectrum and the invention is especially, but not exclusively, concerned with optical cables of the aforesaid kind for use in the communications field in which the optical fibers are adapted for transmission of light having a wavelength within the range 0.8 to 2.1 $\mu$m.

The invention is particularly concerned with an optical cable of the aforesaid kind in which the flexible core is of approximately circular transverse cross-section and comprises a plurality of flexible elongate bodies of approximately sector-shaped transverse cross-section helically laid-up together, each of which bodies throughout its length is made of a composition comprising a multiplicity of longitudinally stressed flexible elongate non-metallic reinforcing elements substantially encapsulated in extruded plastics material and each of at least some of which elongate bodies has in its outer arcuate surface a longitudinally extending groove. The flexible core of the optical cable of the aforesaid kind with which the invention is particularly concerned will, for convenience, hereinafter be referred to as "a flexible core as hereinbefore described".

It is an object of the present invention to provide an improved method of manufacturing a flexible core as hereinbefore described.

According to the invention the improved method comprises the steps of drawing a multiplicity of flexible elongate non-metallic reinforcing elements under tension in the directions of their lengths through electrically insulating plastics material which is in a liquid or semi-liquid state; causing the multiplicity of non-metallic reinforcing elements encapsulated in electrically insulating plastics material in a liquid or semi-liquid state to pass through an elongate die having an outlet orifice having a transverse cross-section approximating to a sector of a circle to form a flexible elongate body of approximately sector-shaped transverse cross-section, which die, between its ends, is of such a shape that non-metallic reinforcing elements constituting or adjacent to the arcuate surface of the flexible elongate body so formed are travelling at a greater linear speed than non-metallic reinforcing elements remote therefrom, and which has means protruding inwardly of the die and forming in the arcuate surface of the body a longitudinally extending groove; causing the flexible elongate body as it emerges from the die to follow helical path within an imaginary cylinder of substantially circular transverse cross-section in such a way that the arcuate surface of the body is maintained outermost and so treating the helically advancing body that the plastics material in which the reinforcing elements are encapsulated sets; at least partially filling the groove in the arcuate surface of the helically advancing flexible elongate body with a water-impermeable medium of a grease-like nature and continuously feeding into the water-impermeable medium in the groove at least one optical fibre; laying up the helically advancing flexible elongate body housing in its groove at least one optical fiber with a plurality of helically advancing flexible elongate bodies of similar transverse cross-section and construction to form a flexible core of approximately circular transverse cross-section which has in its outer surface a plurality of circumferentially spaced, helically extending grooves in which optical fibres are loosely housed and which is rotating about its longitudinal axis; and taking up the flexible core in such a way that any residual torsion in the core arising from said rotation is removed.

Preferably, the flexible elongate bodies of approximately sector-shaped transverse cross-section having optical fibers loosely housed in longitudinally extending grooves in their arcuate surfaces are manufactured concurrently and the helically advancing bodies are laid up together downstream of a station at which optical fibers are continuously fed into the grooves of the bodies. A single flexible elongate body or a sub-assembly of at least two flexible elongate bodies at each of a plurality of longitudinally spaced laying up stations, but, preferably, all the helically advancing flexible elongate bodies are laid up together at a single station.

Between its ends, the elongate die preferably extends-in a smoothly curved arcuate path, the internal surface of the die defining the arcuate surface of the flexible elongate body having the greater radius of curvature. By virtue of the fact that the elongate die between its ends follows a smoothly curved path, the non-metallic reinforcing elements immediately adjacent that part of the inner surface of the die having the greater radius of curvature will travel under tension at a linear speed greater than that of the non-metallic reinforcing elements remote therefrom. Preferably, over at least a major part of the length of the smoothly curved elongate die, the internal surface of the die defining the arcuate surface of the sector-shaped flexible elongate body and the internal surface of the die defining the apex of the sector-shaped flexible elongate body are so curved that the transverse cross-section of the smoothly curved elongate die is substantially constant in shape and size to ensure that the non-metallic reinforcing elements are drawn through the die at the desired linear speeds relative to one another.

At its entry end, the elongate die preferably opens into and forms part of an open-topped chamber into which the electrically insulating plastics material in a liquid or semi-liquid state is fed, preferably through an inlet port intermediate of the ends of the die. The multiplicity of flexible elongate non-metallic reinforcing elements preferably are drawn under tension approximately vertically downwardly into the open topped chamber of electrically insulating plastics material in a liquid or semi-liquid state.

The means by which a longitudinally extending groove is formed in the arcuate surface of the flexible elongate body preferably takes the form of a blade or plurality of fingers which protrudes inwardly of and at least partly along the die at or near its outlet end. Preferably, the blade or each finger has a transverse cross-section approximating in shape to the frustum of a cone and the blade of plurality of fingers extends along at least a major part of the length of the die.

In order to cause the flexible elongate body as it emerges from the die to follow a helical path within an imaginary cylinder of substantially circular transverse cross-section in such a way that the arcuate surface of the body is maintained outermost, preferably immediately downstream of the smoothly curved die the flexible elongate body passes into a helically extending channel of substantially V-shaped cross-section in the outer surface of a substantially rigid elongate member and, as the flexible elongate body travels along the helically extending channel, the electrically insulating plastics material in which the non-metallic reinforcing elements are encapsulated in so treated that it is caused to set. To maintain the shape of the helical groove formed in the arcuate surface of the flexible elongate body, preferably as the body travels along the helically extending channel in the outer surface of the rigid elongate member a helical blade engages in and maintains the shape of the groove in the arcuate surface of the flexible body until the electrically insulating plastics material has set.

Preferably, the smoothly curved arcuate path of the elongate die and the shape of the helically extending channel of the rigid elongate member are so related that the relative positions of the non-metallic reinforcing elements within the flexible elongate body being formed are maintained substantially constant and the transition from the single curve of the elongate die to the compound curve of the helically extending channel is accomplished without any undesirable strain being imposed on the elements. There may be some relative movement between adjacent or neighbouring elements which the semi-liquid state of the electrically insulating plastics material allows.

To facilitate feeding of water-impermeable medium of a grease-like nature into the groove in the arcuate surface of the flexible elongate body, preferably, at a position at which the groove in the arcuate surface of the helically advancing flexible elongate body is uppermost, water-impermeable medium of a grease-like nature is continuously fed downwardly into the groove, e.g. by causing the grease-like water-impermeable medium to flow downwardly on the surface of and to drip from a downwardly extending substantially rigid elongate guide.

The flexible elongate body is drawn through the smoothly curved die and helically channelled elongate member by any convenient means. Having regard to the relatively slow speed at which the flexible elongate body is formed, the drawing means preferably takes the form of a pair of longitudinally spaced and reciprocating clamps each of which intermittently and out of sequence with the other grips the advancing body, advances a predetermined distance, releases the body and returns to its original position so that the body is drawn continuously from the smoothly curved die; alternatively, the drawing means may be a pair of driven endless belts which are rotatably driven bodily around the axis of the helically advancing body.

After the helically advancing flexible elongate bodies have been laid up together to form the flexible core rotating about its longitudinal axis, preferably the flexible core is drawn by a pair of longitudinally spaced and reciprocating clamps each of which intermittently and out of sequence with the other grips the advancing flexible core, advances a predetermined distance, releases the core and returns to its original position so that the advancing flexible core is drawn continuously but, in this case, to accommodate for the fact that the advancing flexible core is rotating about its longitudinal axis, whilst each clamp is gripping the core and advancing said predetermined distance, the clamp is constrained to rotate with the core.

The take up means by which any residual torsion is removed from the rotating flexible core may be a drum twister or it may take the form of a rotatably driven turntable on to which the rotating flexible core is so coiled that any residual torsion in the core is removed.

Preferably, the optical fiber is so fed into the water-impermeable medium in the groove that it lies immediately below the surface of the medium so that, when a tensile force is applied to the flexible core of which the flexible elongate body forms a part causing the core to stretch, the optical fiber can move radially inwardly through the medium towards the axis of the core, thereby substantially reducing risk of unacceptable tensile force being applied to the optical fiber. To this end, preferably the optical fiber is drawn from a source of supply towards the station at which it is fed into the water-impermeable medium in the groove in a path which lies at an acute angle to the path of the helically advancing body so that, over a predetermined axial length of the body, an excess length of optical fiber is provided. Preferably, also, the optical fiber is drawn from the source of supply by longitudinally spaced and reciprocating clamps operating in a manner similar to that of, and preferably mechanically coupled to, the clamps of the other drawing means. The source of supply of optical fiber preferably is so mounted that it is bodily rotatable in space and is operatively coupled to the take-up means so that, when the take-up means rotates to remove any residual torsion from the rotating flexible core, the source of supply of optical fiber rotates to remove any twist in the optical fiber that would otherwise by imparted by rotation of the advancing flexible core about its longitudinal axis.

Downstream of the means drawing the laid up flexible elongate bodies forming the rotating flexible core, at least one tape of electrically insulating material or other flexible binder may be helically lapped round the laid-up bodies, the direction of lay of the helically wound tape being opposite to that of the laid-up bodies.

The flexible elongate non-metallic reinforcing elements of the flexible elongate body preferably are made of an aromatic polyamide such as that sold under the trade name 'KEVLAR'; an alternative non-metallic material of which they may be made in non-optical glass.

The electrically insulating plastics material in which the non-metallic reinforcing elements are encapsulated preferably is a theromoplastics material, such as polypropylene or nylon but, in some circumstances, it may be a thermosetting plastics material, such as a polyester or epoxy resin or polyurethane.

Other electrically insulating plastics materials in which the non-metallic reinforcing elements may be encapsulated are thermotropic liquid crystalline polymers such as wholly aromatic polyesters, aromatic-aliphatic polyesters, aromatic polyazomethines, aromatic polyester-carbonates and wholly or non-wholly aromatic polyester amides.

Where the plastics material in which the non-metallic reinforcing elements are encapsulated is a thermoplastics material, the plastics material will be introduced into the chamber at such a temperature that the material is in a liquid or semi-liquid state and the chamber and/or elongate die will be heated to maintain the material at that temperature. Cooling air will be directed on to the helically channelled elongate member in order to cause the plastics material to set.

Where the plastics material is a thermosetting material, the helically channelled elongate member will be heated in order to cause the plastics material to set.

The invention also includes apparatus for carrying out the improved method as hereinbefore described.

The invention further includes an elongate flexible core as hereinbefore described when manufactured by the improved method hereinbefore described.

The flexible core as hereinbefore described manufactured by the improved method of the invention has the important advantage that an optical cable of which it forms a part is so flexible that it can be readily handled, and wound on and unwound from a cable drum, without substantially any risk of danger to an operative arising from an inherent torsion or stiffness in the cable. Moreover, the flexibility of the flexible core is such that an optical cable having a flexible core manufactured by the improved method of the invention can be readily strung in long lengths between poles, towers or other upstanding supports and used as an aerial cable. A flexible core manufactured by the improved method of the invention has the further important advantage that the multiplicity of non-metallic reinforcing elements are distributed substantially evenly throughout each flexible elongate body of sector-shaped transverse cross-section and that, as a consequence, when a cable incorporating the core is stressed, strain is applied substantially evenly across the transverse cross-sections of all the flexible elongate bodies.

The invention is further illustrated by a description, by way of example, of a preferred optical cable incorporating a flexible core as hereinbefore described and of the preferred method of manufacturing a flexible core as hereinbefore described with reference to the accompany drawings, in which.

Figure 3:
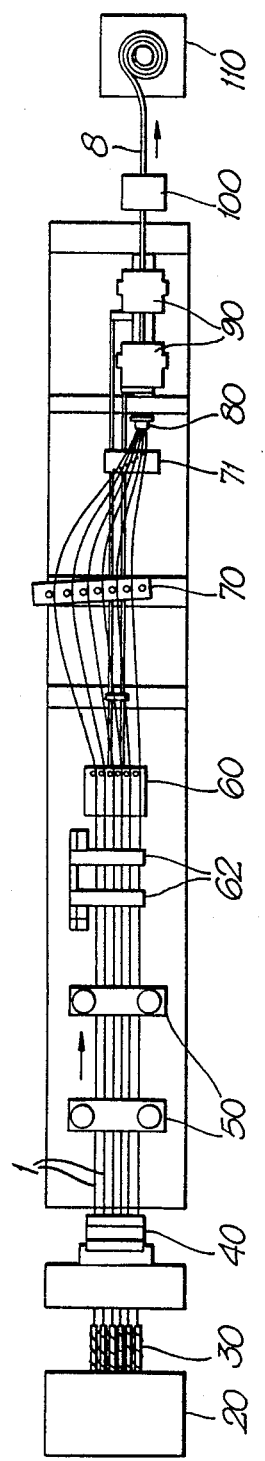
Figure 4:
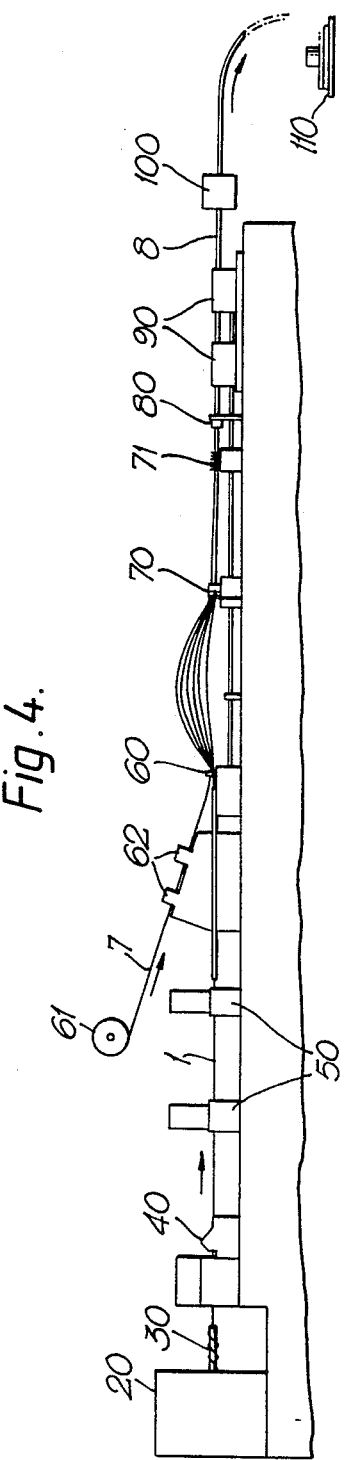
Figure 5:
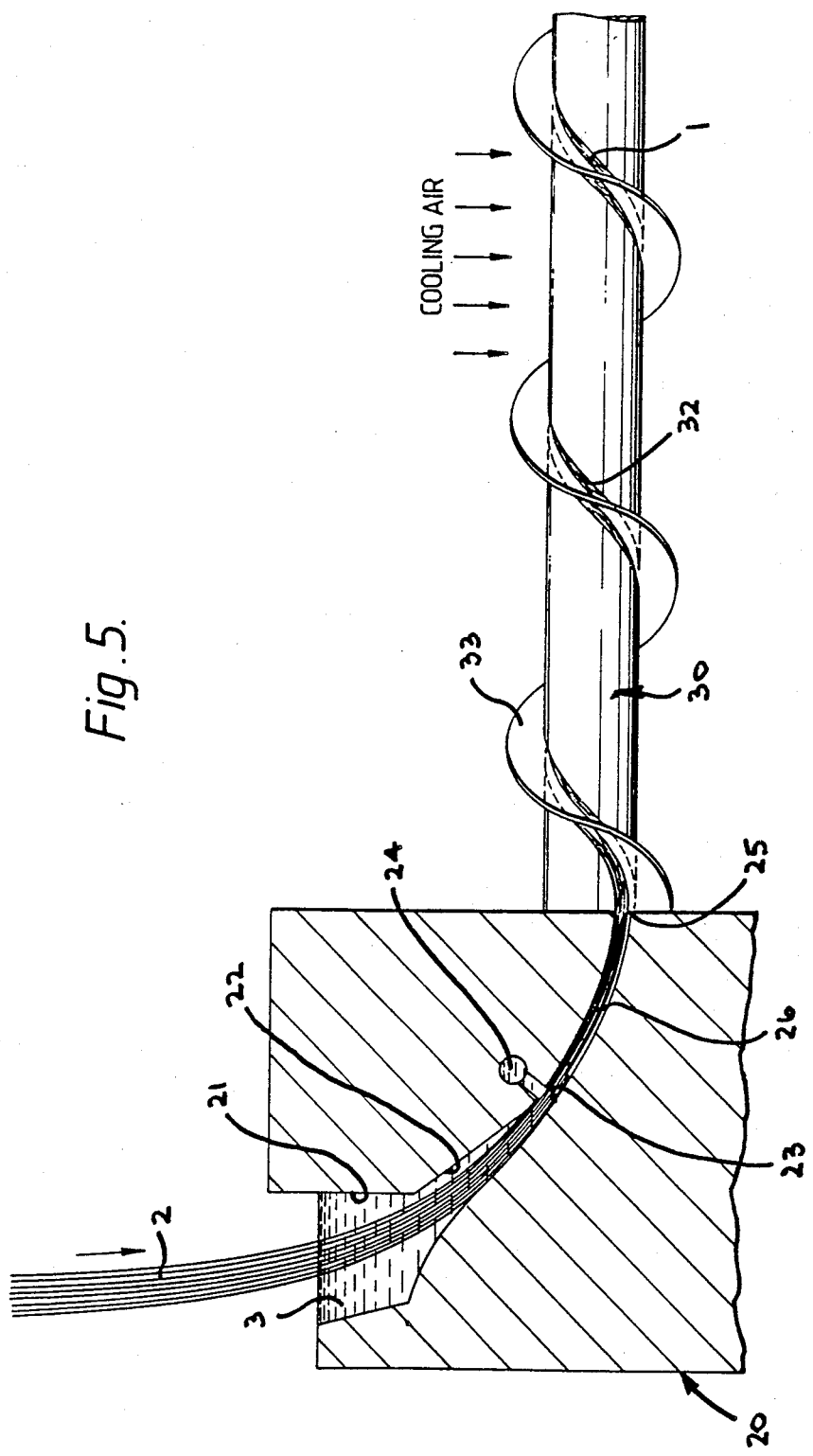

FIGS. 3 and 4, respectively, are diagrammatic plan and side views of the apparatus employed in the manufacture of a flexible core as hereinbefore described, and FIG. 5 is a diagrammatic side view, partly in section and partly in elevation, of one preferred elongate die and helically channelled rigid elongate member for forming a flexible elongate body of sector-shaped transverse cross-section which is to form part of a flexible core as hereinbefore described.

Figure 1:
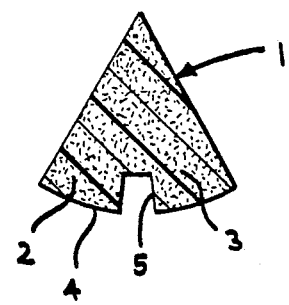
FIG. 1 is a transverse cross-sectional view, drawn on an enlarged scale, of a flexible elongate body of sector-shape transverse cross-section which is to constitute a component part of a flexible core as hereinbefore described.

A preferred flexible core as hereinbefore described comprises six flexible elongate bodies 1, each of sector-shaped transverse cross-section, helically laid up together. As will be seen on referring to FIG. 1, each body throughout its length is made of a composition comprising a multiplicity of longitudinally stressed flexible elongate non-metallic reinforcing elements 2 encapsulated in extruded plastics material 3 and has in its outer arcuate surface 4 a longitudinally extending groove 5.

Figure 2:
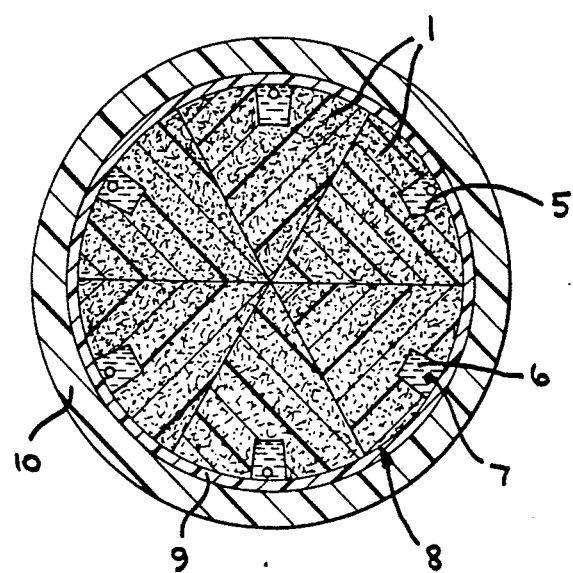
FIG. 2 is a transverse cross-sectional view, drawn on an enlarged scale, of the preferred form of optical cable.

As will be seen on referring to FIG. 2, the preferred optical cable comprises a flexible core 8 of circular transverse cross-section comprising six flexible elongate bodies 1 of sector-shaped transverse cross-section helically laid up together, a plastics tape 9 helically wound around the laid up bodies and an overall protective sheath 10 of plastics material. The groove 5 in each of the flexible elongate bodies 1 is substantially filled with a water-impermeable medium 6 of a grease-like nature and an optical fiber 7 is immersed in the water-impermeable medium in each groove immediately below the surface of the medium.

Referring to FIGS. 3 and 4, the apparatus employed in the manufacture of the preferred flexible core of the optical cable shown in FIG. 2 comprised six chambers and associated dies generally referred to at 20 and six helically channelled rigid rods 30, one of which is associated with each die. Downstream of the six chambers and associated dies 20 and helically channelled rods 30 is a station 40 at which water-impermeable medium 6 of a grease-like nature is continuously fed into the groove 5 in the arcuate surface 4 of each of six flexible elongate bodies 1 emerging from the helically grooved rods. Downstream of the station 40 are six pairs of reciprocating two-part clamps generally referred to at 50 by means of which the flexible elongate bodies 1 are continuously drawn from the dies 20 and helically channelled rods 30. Each two-part clamp has in its clamping surface a helical slot in which a flexible body 1 can be so gripped that helical advance of the body is temporarily restrained. Beyond the clamps is a station 60 at which optical fibers 7 are continuously fed into the water-impermeable medium 6 in the grooves 5 of the flexible elongate bodies. The optical fibers 7 are supplied from sources 61 from which they are drawn by six pairs of reciprocating two-part clamps generally referred to at 62 mechanically coupled to the clamps 50. As will be seen in FIG. 4, the optical fibers 7 in travelling from the sources 61 to the station 60 follow a path which is inclined at an acute angle to the path followed by the flexible elongate bodies 1. Downstream of the station 60 are two guide stations 70 and 71 which serve to orientate the advancing flexible elongate bodies 1 so that they can be laid up together as they pass through a forming die 80 which will press the laid up bodies radially inwardly together to form the flexible core 8 shown in FIG. 2. Beyond the forming die 80 is a pair of reciprocating two-part clamps 90 for drawing the laid-up flexible elongate bodies 1 now forming a flexible core 8 through the forming die, which reciprocating clamps are mechanically coupled to the clamps 50 and 62. Downstream of the clamps 90 is a taping head 100 and a turntable 110 that can be rotatably driven to remove any residual torsion from the flexible core.

As will be seen on referring to FIG. 5, each of the six chambers and dies 20 comprises an open topped chamber 21 which, at the bottom of the chamber, blends by means of a passage 22 of approximately triangular shape into a smoothly curved elongate die 23 which, between its ends, extends in a smoothly curved arcuate path and has a substantially constant transverse cross-section approximating to a sector of a circle. Immediate of the ends of the die 23 is an inlet port 24 by means of which electrically insulating plastics material 3 in a semi-liquid state can be fed into the die and hence the open topped chamber 21. The internal surface of the die 23 defining the arcuate surface of the flexible elongate body 1 has the greater radius of curvature and, over a major part of the length of the smoothly curved elongate die, the internal surface of the die defining the arcuate surface of the sector-shaped flexible elongate body and the internal surface of the die defining the apex of the sector-shaped elongate body are so curved that the transverse cross-section of the die is substantially constant in shape and size to ensure that the non-metallic reinforcing elements 2 are drawn through the die at the desired linear speeds relative to one another. Extending along a major part of the length of the internal surface of the die defining the arcuate surface of the sector-shaped flexible elongate body 1 near the outlet end 25 is a blade 26 which protrudes inwardly of the die and which has a transverse cross-section approximating in shape to the frustum of a cone. At its downstream outlet end 25, the elongate die 23 opens into one end of a helically extending channel 32 of V-shaped cross-section in the outer surface of a rigid rod 30 of circular cross-section which extends substantially horizontally from the body of the chamber 20. A helically extending blade 33 protrudes into the helically extending channel 32 throughout its length and serves to maintain the shape of the groove 5 formed by the blade 26 in the arcuate surface 4 of the flexible elongate body 1.

In use, a multiplicity of flexible reinforcing elements 2 of aromatic polyamide are drawn under tension in the direction of their lengths and downwardly through electrically insulating thermoplastics material 3 which is continuously fed into the open topped chamber 21 through the inlet port 24 and which is at such a temperature that the thermoplastics material is in a semi-liquid state. The multiplicity of reinforcing elements 2 encapsulated in electrically insulating thermoplastics material 3 in a semi-liquid state pass through the elongate die 23 to form a flexible elongate body 1 which has a transverse cross-section approximating to a sector of a circle having in its arcuate surface 4 a groove 5. The multiplicity of reinforcing elements 2 are substantially evenly distributed throughout the cross-sectional area of the body 1. Immediately downstream of the smoothly curved die 23, the flexible elongate body 1 passes into the helically extending channel 32 in the outer surface of the rigid rod 30 with the helical blade 33 engaging in the groove 5, and, as the flexible elongate body travels along the helically extending channel, cooling air is directed from a source (not shown) onto the rigid rod to cause the electrically insulating thermoplastics material 3 of the advancing body set. The smoothly curved die 23 is of such a shape that reinforcing elements 2 constituting and adjacent to the arcuate surface of the flexible elongate body 1 are travelling at a linear speed greater than that of reinforcing elements remote therefrom. Since the flexible elongate body 1 is travelling along the helical channel 32 in the outer surface of the rigid rod 30, the body is rotating about the rigid rod and the arcuate surface of the body is maintained outermost.

From the rigid rods 30, the six helically advancing flexible elongate bodies 1 pass through the station 40, so positioned that at the station the grooves 5 in the arcuate surfaces 4 of the bodies are uppermost, and at this station water-impermeable medium 6 of a grease-like nature is continuously fed downwardly into the grooves 5 by causing the medium to flow downwardly on the surface of and to drip from a downwardly extending rigid elongate guide (not shown).

The six helically advancing flexible elongate bodies 1 being manufactured concurrently are withdrawn continuously from the smoothly curved die, around the helically channelled rod 30 and through the station 40 by the six pairs of longitudinally spaced and reciprocating two-part clamps 50, each of which clamps intermittently and out of sequence with the other so grips an advancing body that helical movement of the body is restrained temporarily, advances a predetermined distance, releases the body which recovers the helical orientation temporarily inhibited by the clamp, and returns to its original position.

Beyond the reciprocating clamps 50, the helically advancing flexible elongate bodies pass through a station 60, which is so positioned that the grooves 5 in the arcuate surfaces 4 of the bodies are uppermost, and optical fibers 7 from the sources 61 are fed continuously into the water-impermeable medium in the grooves. The optical fibers 7 are continuously withdrawn from the sources 61 by the longitudinally spaced and reciprocating clamps 62 each of which is mechanically coupled to the clamps 50. Each clamp 62 intermittently and out of sequence with the other grips the advancing optical fibers, advances a predetermined distance, releases the optical fibers and returns to its original position so that the optical fibers are drawn continuously from the sources 61. The optical fibers 7 are continuously advancing in a path which lies at an acute angle to the path followed by the helically advancing flexible elongate bodies 1 so that, over a predetermined axial length of each body, an excess length of optical fiber is provided and, when the optical fiber is fed into the water-impermeable medium 6 in a groove 5 it will lie immediately below the surface of the medium. The sources 61 of optical fiber are so mounted that they are capable of rotating bodily in space and are so mechanically coupled to the rotatably driven turntable 110 that, as the turntable is rotatably driven to remove any residual torsion in the flexible core 8, each of the sources 61 is bodily rotated to remove any twist from the optical fiber 7 being continuously withdrawn therefrom which would otherwise be imparted by the rotation of the flexible core about its axis.

Downstream of the station 60, the helically advancing flexible elongate bodies 1 pass through guides 70 which appropriately orientate the helically advancing bodies so that they are helically laid up together to form a flexible core of circular cross-section as they pass through and are pressed radially inwardly together by the forming die 80 to form the flexible core 8.

The flexible core 8 emerging from the forming die 80 and rotating about its axis is continuously drawn by the longitudinally spaced and reciprocating clamps 90 which are mechanically coupled to the clamps 50 and 62. Each of the clamps 90 intermittently and out of sequence with the other grips the advancing flexible core, advances a predetermined distance, releases the core and returns to its original position but, as the advancing flexible core is rotating about its axis, whilst each clamp 90 is gripping the core and advancing said predetermined distance, the clamp is constrained to rotate with the core.

Immediately downstream of the reciprocating clamps 90 at a taping head 100, a plastics tape 9 is helically wound around the flexible core 8, the direction of lay of the tape being opposite to that of the flexible elongate bodies 1. The flexible core 8 is fed downwardly on to the turntable 110 which is rotatably driven at such a speed that, in addition to facilitating coiling down of the core, the rotating turntable also removes any residual torsion in the core by completing approximately one revolution for each pitch of the laid up helically extending bodies 1.

To complete manufacture of the optical cable shown in FIG. 2, in a separate operation the sheath 10 of plastics insulating material is extruded over the plastics tape-covered flexible core 8.

What I claim as my invention is:

1. A method of manufacturing a flexible core of approximately circular transverse cross-section comprising a plurality of flexible elongate bodies of approximately sector-shaped transverse cross-section helically laid up together, each of which bodies throughout its length is made of a composition comprising a multiplicity of longitudinally stressed flexible elongate non-metallic reinforcing elements substantially encapsulated in extruded plastics material and each of at least some of which elongate bodies has in its outer arcuate surface a longitudinally extending groove, which method comprises the steps of:

(a) drawing a multiplicity of flexible elongate non-metallic reinforcing elements under tension in the direction of their lengths through electrically insulating plastics material which is in a liquid or semi-liquid state; causing the multiplicity of non-metallic reinforcing elements encapsulated in electrically insulating plastics material in a liquid or semi-liquid state to pass through an elongate die having an outlet orifice having a transverse cross-section approximating to a sector of a circle to form a flexible elongate body of approximately sector-shaped transverse cross-section, which die, between its ends, is of such a shape that non-metallic reinforcing elements adjacent to the arcuate surface of the flexible elongate body so formed are travelling at a greater linear speed than non-metallic reinforcing elements remote therefrom, and which has means protruding inwardly of the die and forming in the arcuate surface of the body a longitudinally extending groove;

(b) causing the flexible elongate body as it emerges from the die to follow a helical path within an imaginary cylinder of substantially circular transverse cross-section in such a way that the arcuate surface of the body is maintained outermost and so treating the helically advancing body that the plastics material in which the reinforcing elements are encapsulated sets;

(c) at least partially filling the groove in the arcuate surface of the helically advancing flexible elongate body with a water-impermeable medium of a grease-like nature and continuously feeding into the water-impermeable medium in the groove at least one optical fiber;

(d) laying up the helically advancing flexible elongate body housing in its groove at least one optical fiber with a plurality of helically advancing flexible elongate bodies of similar transverse cross-section and construction to form a flexible core of approximately circular transverse cross-section which has in its outer surface a plurality of circumferentially spaced, helically extending grooves in which optical fibers are loosely housed and which is rotating about its longitudinal axis; and (e) taking up the flexible core in such a way that any residual torsion in the core arising from said rotation is removed.

2. A method as claimed in claim 1, wherein the flexible elongate bodies of approximately sector-shaped transverse cross-section having optical fibers loosely housed in longitudinally extending grooves in their arcuate surfaces are manufactured concurrently and the helically advancing bodies are laid up together downstream of the stations at which optical fibers are continuously fed into the grooves of the bodies.

3. A method as claimed in claim 2, wherein all the helically advancing flexible elongate bodies are laid up together at a single station.

4. A method as claimed in claim 1, wherein the elongated die extends in a smoothly curved arcuate path, the internal surface of the die defining the arcuate surface of the flexible elongate body having the greater radius of curvature.

5. A method as claimed in claim 4, wherein, over at least a major part of the length of the smoothly curved elongate die, the internal surface of the die defining the arcuate surface of the sector-shaped flexible elongate body and the internal surface of the die defining the apex of the sector-shaped flexible elongate body are so curved that the transverse cross-section of the smoothly curved elongate die is substantially constant in shape and size to ensure that the non-metallic reinforcing elements are drawn through the die at the desired linear speeds relative to one another.

6. A method as claimed in claim 4, wherein, at its entry end, the elongate die opens into and forms part of an open-topped chamber into which the electrically insulating plastics material in a liquid or semi-liquid state is fed and the multiplicity of flexible elongate non-metallic reinforcing elements are drawn under tension approximately vertically downwardly into the chamber.

7. A method as claimed in claim 6, wherein the electrically insulating plastics material in a liquid or semi-liquid state is fed into the chamber through an inlet port intermediate of the ends of the die.

8. A method as claimed in claim 1, wherein the longitudinally extending groove is formed in the arcuate surface of the flexible elongate body by a blade which protrudes inwardly of and at least partly along the die near its outlet end.

9. A method as claimed in claim 1, wherein immediately downstream of the elongate die, the flexible elongate body passes into a helically extending channel of substantially V-shaped cross-section in the outer surface of a substantially rigid elongate member and, as the flexible elongate body travels along the helically extending channel, the electrically insulating plastics material in which the non-metallic reinforcing elements are encapsulated is so treated that it is caused to set.

10. A method as claimed in claim 9, wherein, as the body travels along the helically extending channel in the outer surface of the rigid elongate member, a helical blade engages in and maintains the shape of the groove in the arcuate surface of the flexible body until the electrically insulating plastics material has set.

11. A method as claimed in claim 1, wherein, at a position when the groove in the arcuate surface of the helically advancing flexible elongate body is uppermost, water-impermeable medium of a grease-like nature is continuously fed downwardly into the groove.

12. A method as claimed in claim 1, wherein the flexible elongate body is drawn from the elongate die by a pair of longitudinally spaced and reciprocating clamps each of which intermittently and out of sequence with the other grips the advancing body, advances a predetermined distance, releases the body and returns to its original position so that the body is drawn continuously from the die.

13. A method as claimed in claim 1, wherein the flexible core formed by the laid-up flexible elongate bodies and rotating about its longitudinal axis is drawn by a pair of longitudinally spaced and reciprocating clamps each of which intermittently and out of sequence with the other grips the advancing flexible core, advances a predetermined distance, releases the core and returns to its original position so that the advancing flexible core is drawn continuously, each clamp, whilst gripping the core and advancing said predetermined distance, being constrained to rotate with the core to accommodate said rotation of the flexible core about its axis.

14. A method as claimed in claim 1, wherein the take-up means by which any residual torsion is removed from the rotating flexible core is a rotatably driven turntable on to which the rotating flexible core is so coiled that any residual torsion in the core is removed.

15. A method as claimed in claim 14, wherein the source of supply of optical fiber is so mounted that it is bodily rotatable in space and is so mechanically coupled to the take-up means that, when the take-up means rotates to remove any residual torsion from the rotating flexible core, the source of supply of optical fiber rotates to remove any twist in the optical fiber that would otherwise be imparted by rotation of the advancing flexible core about its longitudinal axis.

16. A method as claimed in claim 1, wherein the optical fiber is so fed into the water-impermeable medium in the groove that it lies immediately below the surface of the medium.

17. A method as claimed in claim 16, wherein the optical fiber is drawn from a source of supply towards the station at which it is fed into the water-impermeable medium in the groove in a path which lies at an acute angle to the path of the helically advancing body so that, over a predetermined axial length of the body, an excess length of optical fiber is provided.

18. A method as claimed in claim 17, wherein the optical fiber is drawn from the source of supply by a pair of longitudinally spaced and reciprocating clamps each of which intermittently and out of sequence with the other grips the advancing optical fiber, advances a predetermined distance, releases the fiber and returns to its original position so that the advancing fiber is drawn continuously.

19. A method as claimed in claim 1, wherein, downstream of the means drawing the rotating flexible core, at least one tape of electrically insulating material is helically lapped around the core, the direction of lay of the helically wound tape being opposite to that of the laid-up bodies of the core.

20. A method as claimed in claim 6, wherein the plastics material in which the non-metallic reinforcing elements are encapsulated is a thermoplastics material, the thermoplastics material is introduced into a chamber at such a temperature that the material is in a liquid or semi-liquid state, the chamber and elongate die are heated to maintain the material at that temperature, and cooling air is directed on to the helically advancing elongate body in order to cause the plastics material to set.

* * * * *